(12) United States Patent
Tanaka et al.

(10) Patent No.: US 9,509,406 B2
(45) Date of Patent: Nov. 29, 2016

(54) OPTICAL TRANSMITTER, OPTICAL RECEIVER, OPTICAL TRANSMISSION SYSTEM, OPTICAL TRANSMITTING METHOD, OPTICAL RECEIVING METHOD AND OPTICAL TRANSMISSION METHOD

(71) Applicant: FUJITSU LIMITED, Kawasaki-shi, Kanagawa (JP)

(72) Inventors: Toshiki Tanaka, Setagaya (JP); Tomoo Takahara, Kawasaki (JP); Masato Nishihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/333,095

(22) Filed: Jul. 16, 2014

(65) Prior Publication Data

US 2015/0071642 A1 Mar. 12, 2015

(30) Foreign Application Priority Data

Sep. 6, 2013 (JP) .................. 2013-185146

(51) Int. Cl.
| | | |
|---|---|---|
| *H04J 3/14* | (2006.01) | |
| *H04L 1/00* | (2006.01) | |
| *H04L 27/00* | (2006.01) | |
| *H04B 10/27* | (2013.01) | |
| *H04B 10/2575* | (2013.01) | |
| *H04B 10/50* | (2013.01) | |
| *H04B 10/60* | (2013.01) | |
| *H04L 27/26* | (2006.01) | |
| *H04L 5/00* | (2006.01) | |

(52) U.S. Cl.
CPC .......... *H04B 10/27* (2013.01); *H04B 10/2575* (2013.01); *H04B 10/50* (2013.01); *H04B 10/60* (2013.01); *H04L 5/001* (2013.01);

*H04L 27/26* (2013.01); *H04L 27/2633* (2013.01); *H04L 27/2655* (2013.01); *H04L 27/2697* (2013.01)

(58) Field of Classification Search
CPC ............ H04L 27/2627; H04L 27/223; H04L 27/2657; H04L 27/2692
USPC ......................................... 398/115, 154, 184
See application file for complete search history.

(56) References Cited

U.S. PATENT DOCUMENTS

| | | | | | |
|---|---|---|---|---|---|
| 5,918,073 | A | * | 6/1999 | Hewitt .................... | G06F 3/061 377/47 |
| 6,150,947 | A | * | 11/2000 | Shima ...................... | A63H 5/00 340/692 |
| 6,751,261 | B1 | * | 6/2004 | Olsson ................ | H04L 27/2662 375/260 |
| 6,842,487 | B1 | * | 1/2005 | Larsson ............... | H04B 7/0671 375/260 |
| 7,391,714 | B2 | * | 6/2008 | Blasco Claret ........ | H04B 3/542 340/12.33 |
| 7,693,429 | B1 | * | 4/2010 | Lowery ................ | H04B 10/548 398/182 |
| 8,934,780 | B2 | * | 1/2015 | Yu ............................ | H04J 11/00 398/152 |

(Continued)

FOREIGN PATENT DOCUMENTS

| | | |
|---|---|---|
| JP | 2009-225137 | 10/2009 |
| JP | 2010-50803 | 3/2010 |

*Primary Examiner* — Oommen Jacob
(74) *Attorney, Agent, or Firm* — Fujitsu Patent Center

(57) ABSTRACT

An optical transmitter includes: a digital signal process unit that generates a drive signal for generating multi-carrier signals through a plurality of independent digital signal processes, the multi-carrier signals having a cyclic prefix and to be transmitted by a parallel transmission; a synchronization unit that synchronizes clocks of the plurality of digital signal processes; and an adjust unit that reduces a delay difference of the cyclic prefix between the multi-carrier signals after the parallel transmission.

14 Claims, 13 Drawing Sheets

(56) References Cited

U.S. PATENT DOCUMENTS

| | | | |
|---|---|---|---|
| 9,107,161 B2* | 8/2015 | Park | H04W 56/005 |
| 2004/0151146 A1* | 8/2004 | Hammerschmidt | H04B 7/0615 |
| | | | 370/338 |
| 2006/0087961 A1* | 4/2006 | Chang | H04L 27/2607 |
| | | | 370/203 |
| 2006/0274842 A1* | 12/2006 | Pan | H04L 5/026 |
| | | | 375/260 |
| 2007/0230591 A1* | 10/2007 | Choi | H04L 27/2676 |
| | | | 375/260 |
| 2008/0086654 A1* | 4/2008 | Sogabe | G06F 1/08 |
| | | | 713/501 |
| 2008/0112497 A1* | 5/2008 | Shan | H04B 7/155 |
| | | | 375/260 |
| 2008/0130506 A1* | 6/2008 | Talwar | H04L 1/0625 |
| | | | 370/236 |
| 2009/0103645 A1* | 4/2009 | Jitsukawa | H04L 27/2607 |
| | | | 375/260 |
| 2009/0232113 A1 | 9/2009 | Tamaki | |
| 2009/0245222 A1* | 10/2009 | Sampath | H04L 27/2655 |
| | | | 370/343 |
| 2009/0300454 A1* | 12/2009 | Miyoshi | H04B 7/0671 |
| | | | 714/748 |
| 2009/0316813 A1* | 12/2009 | Kawasaki | H04L 1/0625 |
| | | | 375/260 |
| 2010/0002796 A1* | 1/2010 | Zhang | H04L 27/2607 |
| | | | 375/267 |
| 2010/0046685 A1* | 2/2010 | Liu | H04L 27/2656 |
| | | | 375/364 |
| 2010/0067603 A1* | 3/2010 | Furudate | H04B 7/0682 |
| | | | 375/267 |
| 2010/0074348 A1* | 3/2010 | Xu | H04L 25/0206 |
| | | | 375/260 |
| 2010/0265882 A1* | 10/2010 | Nagata | H04W 48/16 |
| | | | 370/328 |
| 2011/0004803 A1* | 1/2011 | Yokomakura | H03M 13/29 |
| | | | 714/752 |
| 2011/0090992 A1* | 4/2011 | Chung | H04L 27/0014 |
| | | | 375/340 |
| 2011/0096855 A1* | 4/2011 | Youn | H04B 10/532 |
| | | | 375/260 |
| 2011/0116561 A1* | 5/2011 | Yoo | H04L 27/2665 |
| | | | 375/260 |
| 2011/0134825 A1* | 6/2011 | Kim | H04L 5/0007 |
| | | | 370/312 |
| 2011/0135016 A1* | 6/2011 | Ahn | H04L 5/0037 |
| | | | 375/259 |
| 2011/0211488 A1* | 9/2011 | Kwon | H04L 5/001 |
| | | | 370/252 |
| 2011/0317790 A1* | 12/2011 | Yokokawa | H04L 5/0048 |
| | | | 375/329 |
| 2012/0027419 A1* | 2/2012 | Kaneda | H04B 10/516 |
| | | | 398/158 |
| 2012/0046043 A1* | 2/2012 | Jitsukawa | H04B 7/155 |
| | | | 455/456.1 |
| 2012/0057872 A1* | 3/2012 | Freda | H04L 27/2602 |
| | | | 398/76 |
| 2012/0077519 A1* | 3/2012 | Suh | H04B 7/0671 |
| | | | 455/456.1 |
| 2012/0230449 A1* | 9/2012 | Futatsugi | H04J 11/003 |
| | | | 375/296 |
| 2012/0236916 A1* | 9/2012 | Kobayashi | H04L 27/2662 |
| | | | 375/224 |
| 2012/0300740 A1* | 11/2012 | Iwai | H04B 1/713 |
| | | | 370/329 |
| 2012/0322455 A1* | 12/2012 | Oh | H04L 5/0058 |
| | | | 455/450 |
| 2013/0129007 A1* | 5/2013 | Kumar Reddy | H04L 27/2607 |
| | | | 375/295 |
| 2014/0003819 A1* | 1/2014 | Cho | H04W 72/04 |
| | | | 398/96 |
| 2015/0071642 A1* | 3/2015 | Tanaka | H04B 10/2575 |
| | | | 398/115 |
| 2015/0156045 A1* | 6/2015 | Lee | H04L 27/2613 |
| | | | 375/260 |

* cited by examiner

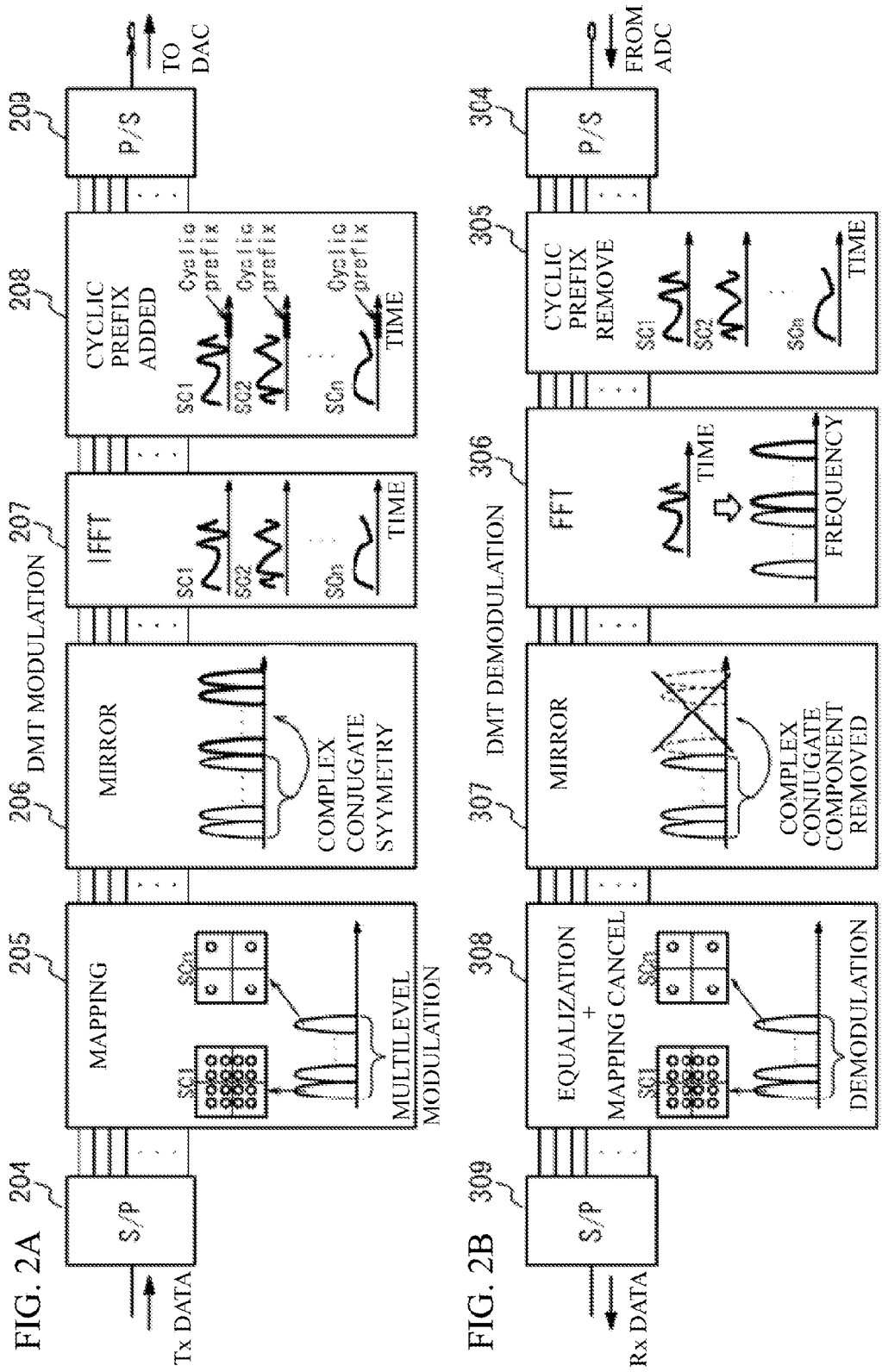

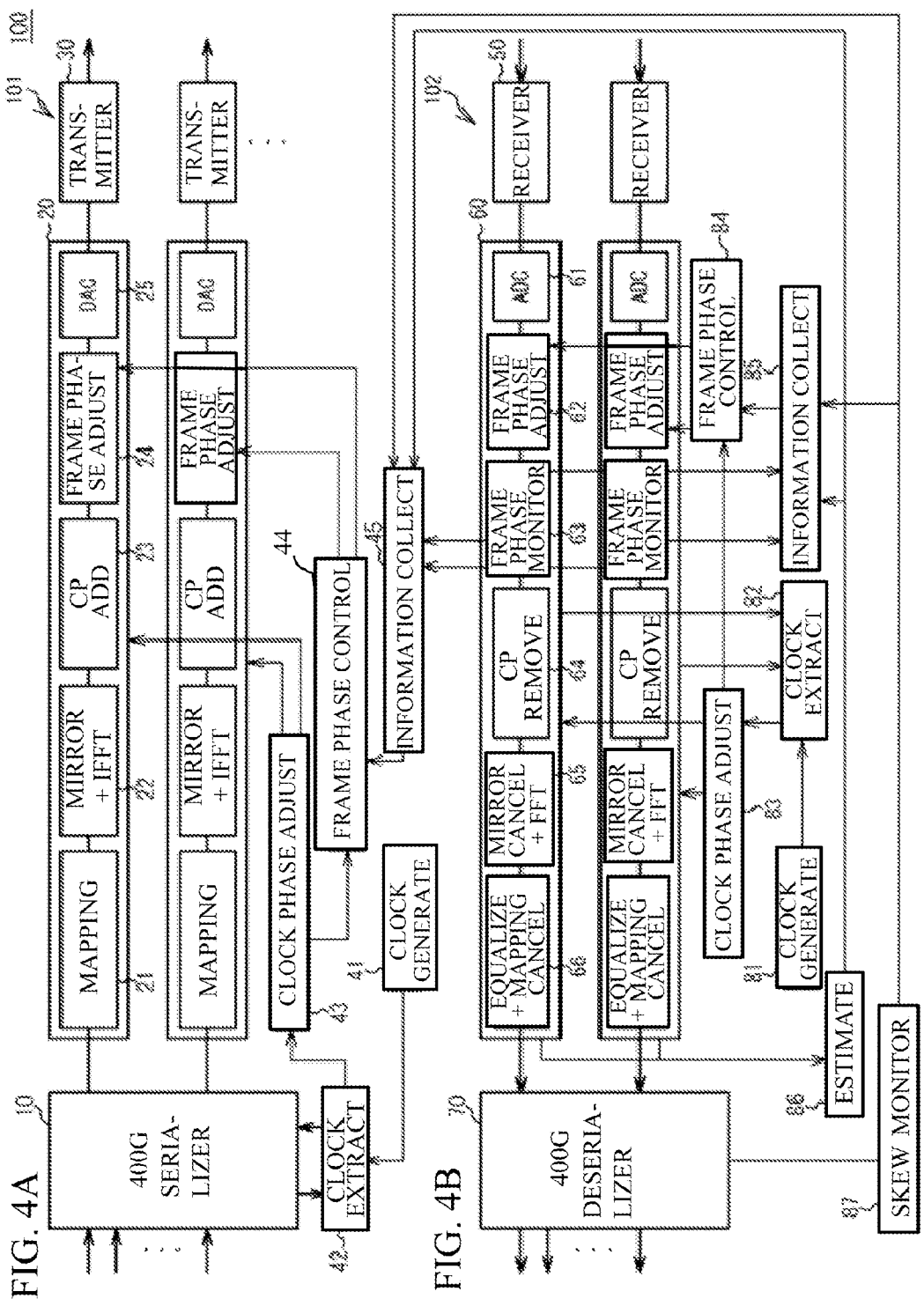

FIG. 5

| EXA-MPLE | CHANNEL No. | TRANSMISSION SYSTEM INFORMATION PARAMETER ||||||
|---|---|---|---|---|---|---|
| | | SIGNAL MULTIPLEXING METHOD | TRANSMISSION DISTANCE | WAVELENGTH | WAVELENGTH DISPERSION | PROPAGATION TIME DIFFERENCE |
| 1 | 1 | WAVELENGTH MULTIPLEXING | 40km | 1270nm | −112ps/nm | 0ps (REFERENCE) |
| | 2 | | 40km | 1290nm | −56ps/nm | 1.1ns |
| | 3 | | 40km | 1310nm | 0ps/nm | 2.2ns |
| | 4 | | 40km | 1330nm | +56ps/nm | 3.3ns |
| 2 | 1 | SPATIAL MULTIPLEXING | 500km | 1310nm BAND | − | 0ps (REFERENCE) |
| | 2 | | 1km | 1310nm BAND | − | 2.5μs |
| | 3 | | 2km | 1310nm BAND | − | 5μs |
| | 4 | | 2km | 1310nm BAND | − | 5μs |
| ⋮ | ⋮ | ⋮ | ⋮ | ⋮ | ⋮ | ⋮ |

BEFORE TRANSMISSION

AFTER TRANSMISSION

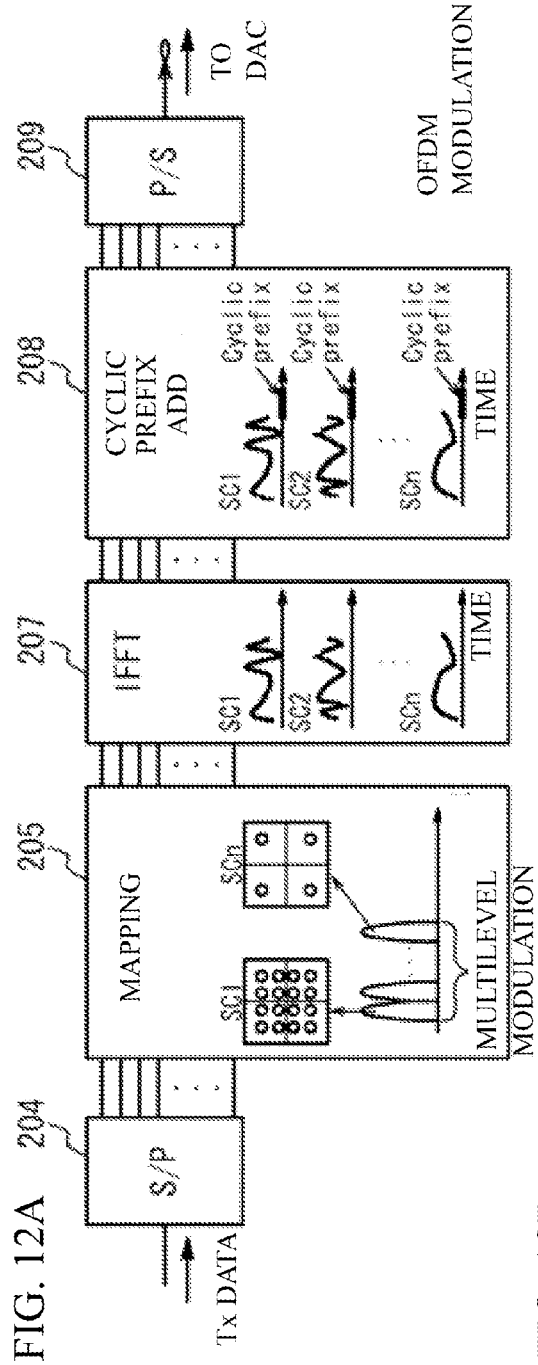
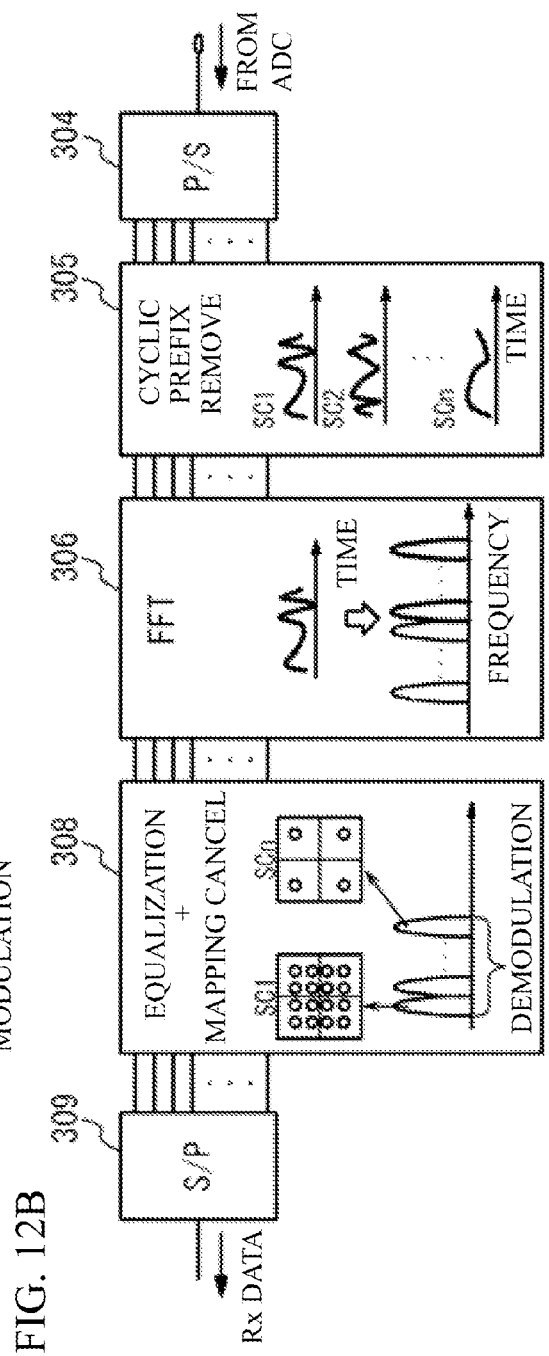

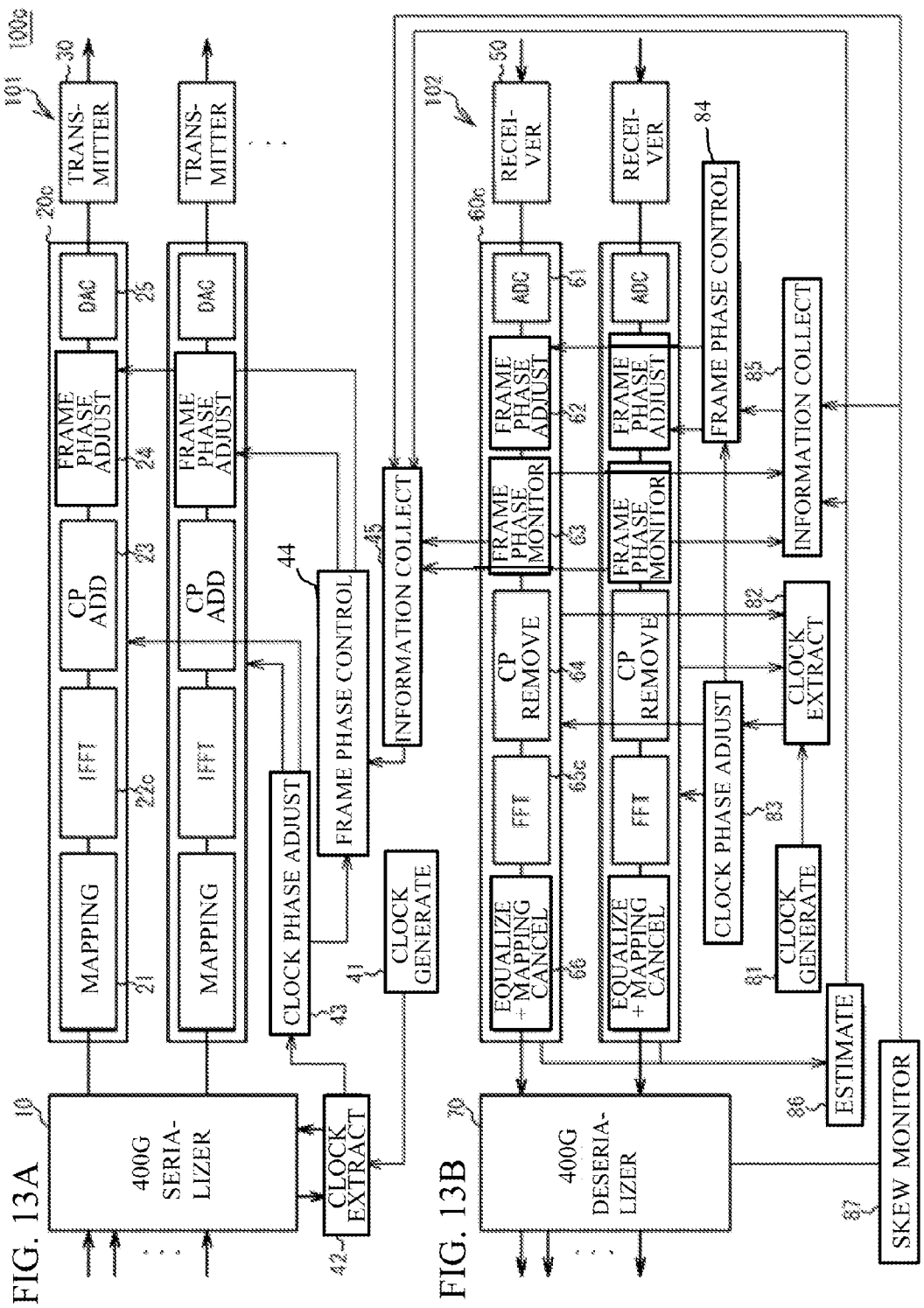

OPTICAL TRANSMITTER, OPTICAL RECEIVER, OPTICAL TRANSMISSION SYSTEM, OPTICAL TRANSMITTING METHOD, OPTICAL RECEIVING METHOD AND OPTICAL TRANSMISSION METHOD

CROSS-REFERENCE TO RELATED APPLICATION

This application is based upon and claims the benefit of priority of the prior Japanese Patent Application No. 2013-185146, filed on Sep. 6, 2013, the entire contents of which are incorporated herein by reference.

FIELD

A certain aspect of embodiments described herein relates to an optical transmitter, an optical receiver, an optical transmission system, an optical transmitting method, an optical receiving method and an optical transmission method.

BACKGROUND

Japanese Patent Application Publication No. 2010-50803 discloses an optical transmission system performing an optical transmission by a parallel transmission method with use of a plurality of optical modules in order to speed up the optical transmission.

SUMMARY

According to an aspect of the present invention, there is provided an optical transmitter including: a digital signal process unit that generates a drive signal for generating multi-carrier signals through a plurality of independent digital signal processes, the multi-carrier signals having a cyclic prefix and to be transmitted by a parallel transmission; a synchronization unit that synchronizes clocks of the plurality of digital signal processes; and an adjust unit that reduces a delay difference of the cyclic prefix between the multi-carrier signals after the parallel transmission.

According to another aspect of the present invention, there is provided an optical receiver including: a digital signal process unit that demodulates multi-carrier signals through a plurality of independent digital signal processes, the multi-carrier signals having a cyclic prefix and transmitted by a parallel transmission; a synchronization unit that synchronizes clocks of the plurality of digital signal processes; and an adjust unit that reduces a delay difference of the cyclic prefix between the multi-carrier signals after the parallel transmission.

According to another aspect of the present invention, there is provided an optical transmission system including: an optical transmitter that has a digital signal process unit that generates a drive signal for generating multi-carrier signals through a plurality of independent digital signal processes, the multi-carrier signals having a cyclic prefix and to be transmitted by a parallel transmission, a synchronization unit that synchronizes clocks of the plurality of digital signal processes and an adjust unit that reduces a delay difference of the cyclic prefix between the multi-carrier signals after the parallel transmission; and an optical receiver that has a digital signal process unit that demodulates multi-carrier signals through a plurality of independent digital signal processes, the multi-carrier signals having a cyclic prefix and transmitted by a parallel transmission; a synchronization unit that synchronizes clocks of the plurality of digital signal processes; and an adjust unit that reduces a delay difference of the cyclic prefix between the multi-carrier signals after the parallel transmission, and a transmission path that has a plurality of lanes that optically couple the optical transmitter and the optical receiver.

According to another aspect of the present invention, there is provided an optical transmitting method including: synchronizing clocks of a plurality of independent digital signal processes when generating a drive signal for generating multi-carrier signals through the plurality of digital signal processes, the multi-carrier signals having a cyclic prefix and to be transmitted by a parallel transmission; and reducing a delay difference of the cyclic prefix between the multi-carrier signals after the parallel transmission.

According to another aspect of the present invention, there is provided an optical receiving method including: synchronizing clocks of a plurality of independent digital signal processes when demodulating multi-carrier signals through the plurality of digital signal processes, the multi-carrier signals having a cyclic prefix and transmitted by a parallel transmission; and reducing a delay difference of the cyclic prefix between the multi-carrier signals after the parallel transmission.

According to another aspect of the present invention, there is provided an optical transmission method that transmits multi-carrier signals having a cyclic prefix by a parallel transmission, the method including: performing an optical transmitting method including synchronizing clocks of a plurality of independent digital signal processes when generating a drive signal for generating multi-carrier signals through the plurality of digital signal processes, the multi-carrier signals having a cyclic prefix and to be transmitted by a parallel transmission and reducing a delay difference of the cyclic prefix between the multi-carrier signals after the parallel transmission; and performing an optical receiving method including synchronizing clocks of a plurality of independent digital signal processes when demodulating multi-carrier signals through the plurality of digital signal processes, the multi-carrier signals having a cyclic prefix and transmitted by a parallel transmission and reducing a delay difference of the cyclic prefix between the multi-carrier signals after the parallel transmission.

BRIEF DESCRIPTION OF DRAWINGS

FIG. 2A illustrates a block diagram of a structure of a DMT modulation unit;

FIG. 2B illustrates a block diagram of a structure of a DMT demodulation unit;

FIG. 4A and FIG. 4B illustrate a block diagram of an optical transmission system in accordance with a first embodiment;

FIG. 5 illustrates a table example of transmission path characteristic;

FIG. 12A illustrates a block diagram of an OFDM modulation unit;

FIG. 12B illustrates a structure of an OFDM demodulation unit; and

FIG. 13A and FIG. 13B illustrate a block diagram of an optical transmission system using an OFDM modulation method in accordance with a fourth embodiment.

DESCRIPTION OF EMBODIMENTS

For example, a DMT (Discrete Multi-Tone) modulation method is being studied as a technology improving a frequency usage effectiveness with a simple structure. It is thought that high-speed optical transmission may be achieved by using a plurality of optical modules of the DMT modulation method. However, when each optical module has a digital signal process unit for modulation/demodulation, a large buffer circuit allowing de-skew is needed in order to compensate for a skew between interconnection lines in the optical module, a skew between channels during transmission or the like.

Figure 1A:
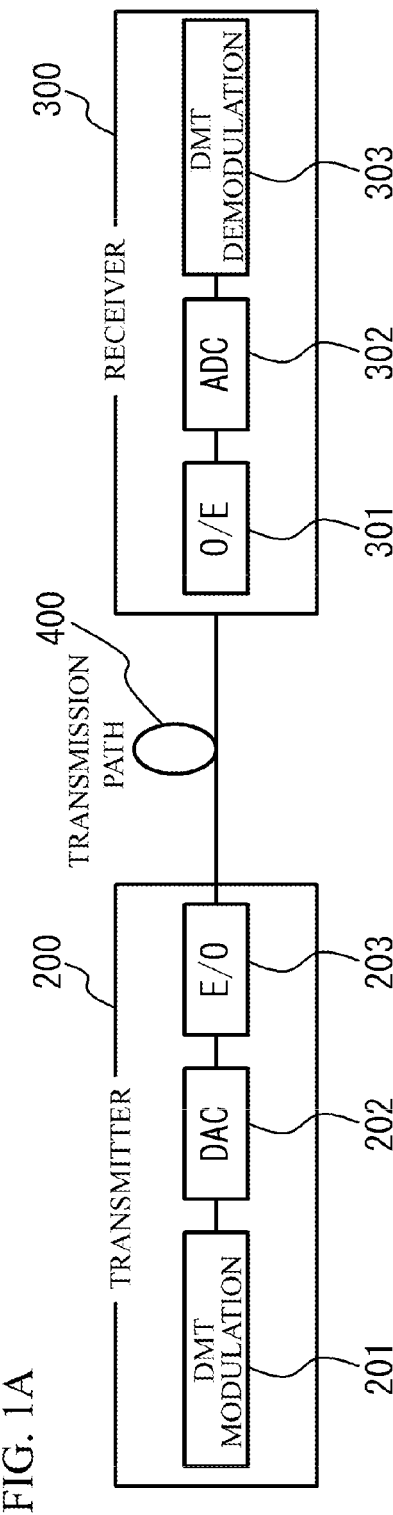
FIG. 1A illustrates a structure of an optical transmission system using a DMT modulation method.

A description will be given of a DMT modulation method before describing embodiments. FIG. 1A illustrates a structure of an optical transmission system using the DMT modulation method. As illustrated in FIG. 1A, the optical transmission system has a structure in which a transmitter 200 and a receiver 300 are coupled with each other via a transmission path 400. The transmitter 200 has a DMT modulation unit 201, a DAC (Digital/Analog convertor) 202, an optical transmitter device 203 and so on. The receiver 300 has an optical receiver device 301, an ADC (Analog/Digital Convertor) 302, a DMT demodulation unit 303 and so on.

The DMT modulation unit 201 is a digital signal process circuit that generates a drive signal for a DMT modulation. The optical transmitter device 203 is a direct-modulation semiconductor laser or the like. The transmission path 400 is an optical fiber or the like. The optical receiver device 301 is a semiconductor light-receiving element or the like. The DMT demodulation unit 303 is a digital signal process circuit that demodulates an electrical signal obtained by photo-conversion.

Figure 1C:
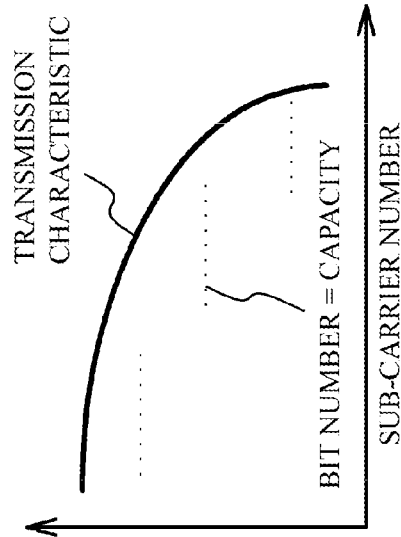
FIG. 1B and FIG. 1C illustrate an operation principle of the DMT modulation method.
Figure 1B:
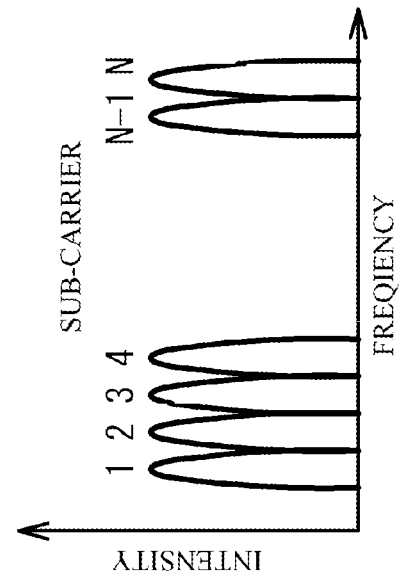

FIG. 1B and FIG. 1C illustrate an operation principle of the DMT modulation method. As illustrated in FIG. 1B, the DMT modulation method is a multi-carrier modulation method and generates a plurality of sub-carriers 1 to N. Each sub-carrier has a different frequency (wavelength) from each other. As illustrated in FIG. 1C, when a bit number is assigned to each sub-carrier according to transmission characteristic, frequency usage efficiency is improved. When an SN (signal-noise) ratio is good, a multiple-value degree can be increased. However, the bit number (capacity) of each sub-carrier is different. The DMT modulation method does not use phase information of a signal light, and thereby achieves an optical transmission by a direct modulation method with a simple structure.

FIG. 2A illustrates a block diagram of a structure of the DMT modulation unit 201. FIG. 2B illustrates a block diagram of a structure of the DMT demodulation unit 303.

As illustrated in FIG. 2A, the DMT modulation unit 201 has a serial/parallel conversion unit 204, a mapping unit 205, a mirror unit 206, an inverse Fourier transform unit 207, a cyclic prefix add unit 208, a parallel/serial conversion unit 209 and so on. The DMT demodulation unit 303 has a serial/parallel conversion unit 304, a cyclic prefix remove unit 305, a Fourier transform unit 306, a mirror cancel unit 307, an equalization/mapping cancel unit 308, a parallel/serial conversion unit 309 and so on.

The serial/parallel conversion unit 204 converts a serial transmission data into n lines of parallel data related to a sub-carrier 1 to a sub-carrier n. The mapping unit 205 performs a mapping (locating of a signal point) for a multiple-value modulation with respect to each sub-carrier according to each parallel data. The mirror unit 206 performs a mirroring of the sub-carrier 1 to the sub-carrier n so that a complex conjugate symmetry is achieved, and obtains intensity information by performing a convolution integral. The inverse Fourier transform unit 207 obtains time axis information by performing IFFT (Inverse Fast Fourier Transform) of frequency information of each sub-carrier.

The cyclic prefix add unit 208 adds a CP (Cyclic Prefix) to a head of a frame of each sub-carrier. The cyclic prefix is a guard section regarding time that is provided to a head of each frame. When the cyclic prefix is added, a frame interference between a delayed wave of a previous frame and a subsequent frame and an interference between sub-carriers caused by degradation of orthogonality between the sub-carriers. The parallel/serial conversion unit 209 converts a parallel data generated by the cyclic prefix add unit 208 into a drive signal having a serial data. The obtained drive signal is transmitted to the DAC 202. The DAC 202 converts the drive signal into an analog electrical signal. The optical transmitter device 203 outputs a modulation signal according to the electrical signal input from the DAC 202.

The optical receiver device 301 converts the received modulation signal into an analog electrical signal. The ADC 302 converts the analog electrical signal into the digital signal. The serial/parallel conversion unit 304 converts the serial digital signal input from the ADC 302 into n lines of parallel data according to the sub-carrier 1 to the sub-carrier n. The cyclic prefix remove unit 305 removes the cyclic prefix that is added to a frame of each sub-carrier.

The Fourier transform unit 306 performs a Fourier transform with respect to each sub-carrier. Thus, the time axis information is converted into frequency information. The mirror cancel unit 307 cancels a mirror component that is a complex conjugate component. The equalization/mapping cancel unit 308 performs an equalization process with respect to each sub-carrier and thereby demodulates with respect to each sub-carrier. The parallel/serial conversion unit 309 converts the parallel data output by the equalization/mapping cancel unit 308 into a serial data.

In the OFDM (Orthogonal Frequency Division Multiplexing), a signal transmission having high resistance against a multi-path interference (interference from a delayed wave) can be achieved by transmitting a wide band signal at high information rate in parallel with use of multi-carrier signals at a low symbol rate. Further, the OFDM can flexibly process a spectrum of a wide signal band width by changing the number of the sub-carrier, because the OFDM uses a sub-carrier signal in a narrow band.

A description will be given of an example achieving a high-speed architecture by using a plurality of optical modules operating at a low bit. As an example, when an optical module operating at relatively low bit of 100 GbE is used in order to achieve an architecture of 400 GbE, cost down allowed by volume efficiency is expected. And so, a structure having four optical modules of 100 GbE may be used.

Figure 3:
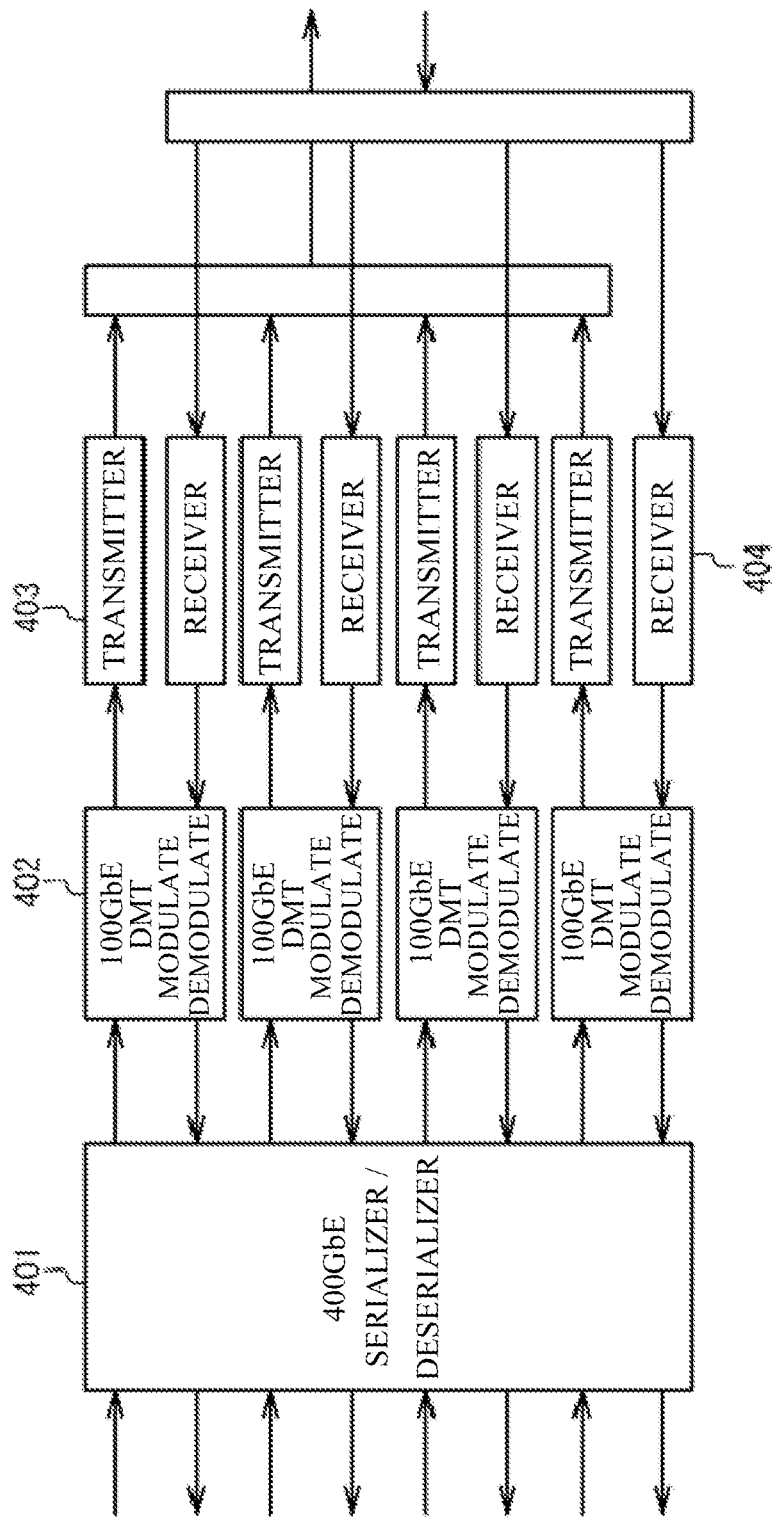
FIG. 3 illustrates a structure of an architecture of 400 GbE with use of four 100 GbE optical modules.

FIG. 3 illustrates a structure of the architecture of 400 GbE with use of the four 100 GbE optical modules. As illustrated in FIG. 3, there are provided a serializer/deserializer 401, four DMT modulation/demodulation units 402, four transmitter devices 403 and four receiver devices 404. The serializer/deserializer 401 acts as a serializer and a deserializer of 400 GbE. The DMT modulation/demodulation unit 402 acts as a modulation/demodulation unit of 100 GbE.

With the structure of FIG. 3, the serializer/deserializer 401 needs a large buffer circuit for achieving de-skew of input/output signals of a multi-port in order to compensate for skew between interconnection lines in the optical module, skew between the channels during the transmission or the like. And so, a description will be given of an optical transmitter, an optical receiver, an optical transmission system, an optical transmitting method, an optical receiving method and an optical transmission method that are capable of de-skewing with a simple structure.

[First Embodiment]

FIG. 4A and FIG. 4B illustrate a block diagram of an optical transmission system 100 in accordance with a first embodiment. FIG. 4A illustrates an optical transmitter 101. FIG. 4B illustrates an optical receiver 102. The optical transmission system 100 has a structure in which the optical transmitter 101 and the optical receiver 102 are coupled via an optical transmission path having a plurality of lanes.

The optical transmitter 101 has a serializer 10, a DMT modulation unit 20, an optical transmitter device 30, a clock generation unit 41, a clock extraction unit 42, a clock phase adjust unit 43, a frame phase control unit 44, an optical system information collect unit 45 and so on. The DMT modulation unit 20 has a mapping unit 21, a mirror/inverse Fourier transform unit 22, a cyclic prefix add unit 23, a frame phase adjust unit 24, and a DAC 25. The optical transmitter device 30 is a direct modulation semiconductor laser or the like. The number of the DMT modulation unit 20 and the optical transmitter device 30 is the same as that of optical modules. For example, when there are provided four optical modules of 100 GbE for achieving the 400 GbE, the number of the DMT modulation unit 20 and the optical transmitter device 30 is four (a channel 1 to a channel 4).

The optical receiver 102 has an optical receiver device 50, a DMT demodulation unit 60, a deserializer 70, a clock generation unit 81, a clock extraction unit 82, a clock phase adjust unit 83, a frame phase control unit 84, an optical system information collect unit 85, an estimation unit 86, a skew monitor unit 87 and so on. The DMT demodulation unit 60 has an ADC 61, a frame phase adjust unit 62, a frame phase monitor unit 63, a cyclic prefix remove unit 64, a mirror cancel/Fourier transform unit 65 and an equalization/mapping cancel unit 66. The optical receiver device 50 is a semiconductor light-receiving element or the like. The number of the optical receiver device 50 and the DMT demodulation unit 60 is the same as the number of the modules. For example, there are provided four optical modules of 100 GbE for achieving 400 GbE, the number of the DMT demodulation unit 60 and the optical receiver device 50 is four (a channel 1 to a channel 4).

A description will be given of an operation of each part of the optical transmission system 100 during an optical transmission. The serializer 10 converts a transmission data transmitted in parallel into a serial data of which number is the same as the number of the optical modules. In the embodiment, the serializer 10 converts the transmission data into four serial data. The DMT modulation unit 20 converts the serial transmission data into n lines of parallel data according to the sub-carrier 1 to sub-carrier n with use of a serial/parallel conversion unit. The mapping unit 21 performs a mapping (locating of signal point) with respect to each sub-carrier for a multi-value modulation according to each parallel data.

The mirror/inverse Fourier transform unit 22 performs a mirroring so that complex conjugate symmetry is achieved with respect to the sub-carrier 1 to the sub-carrier n, and obtains intensity information by performing convolution integral. The mirror/inverse Fourier transform unit 22 obtains time axis information by performing an IFFT (Inverse Fast Fourier Transform) of the frequency information with respect to each sub-carrier. The cyclic prefix add unit 23 adds a cyclic prefix to a frame of each sub-carrier. The frame phase adjust unit 24 adjusts a phase of a frame of each sub-carrier. A parallel/serial conversion unit converts a parallel data of which phase is adjusted by the frame phase adjust unit 24 into a serial data. The obtained serial data is transmitted to the DAC 25 as a drive signal. The DAC 25 converts the drive signal into an analog electrical signal. The optical transmitter device 30 outputs a modulation signal according to the analog electrical signal input by the DAC 25.

The optical receiver device 50 converts the received modulation signal into an analog electrical signal. The ADC 61 converts the analog electrical signal into a digital signal. A serial/parallel conversion unit converts a serial digital signal input by the ADC 61 into n lines of parallel data according to the sub-carrier 1 to the sub-carrier n. The frame phase adjust unit 62 adjusts a phase of a frame of each parallel data. The frame phase monitor unit 63 monitors a frame phase.

The cyclic prefix remove unit 64 removes a cyclic prefix added to a frame of each sub-carrier. The mirror cancel/Fourier transform unit 65 performs a Fourier transform with respect to each sub-carrier. Thus, the time axis information is converted into frequency information. Next, the mirror cancel/Fourier transform unit 65 cancels a mirror component that is a complex conjugate symmetry component. The equalization/mapping cancel unit 66 performs an equalization process with respect to each sub-carrier and demodulates with respect to each sub-carrier. A parallel/serial conversion unit converts a parallel data output by the equalization/mapping cancel unit 66 into a serial data. The deserializer 70 converts the serial data output by the DMT demodulation unit 60 of each module into a parallel data.

Next, a description will be given of a skew adjusting with use of the cyclic prefix. The estimation unit 86 estimates an SNR after transmission of each sub-carrier based on a demodulation data obtained by each DMT demodulation unit 60 and determines an optimal bit number and an optimal power value that are assigned to each sub-carrier. The estimation unit 86 estimates an accumulated wavelength dispersion value and a propagation time difference from a wavelength dependency of the SNR after transmission. The estimation unit 86 transmits the estimated accumulate wavelength dispersion value and the propagation time difference to the optical system information collect units 45 and 85. The skew monitor unit 87 monitors a skew based on each demodulation data at the deserializer 70. The monitor result of the skew monitor unit 87 is transmitted to the optical system information collect units 45 and 85.

The clock generation unit 41 generates a reference clock. The clock extraction unit 42 extracts a clock of the serializer 10 with use of the reference clock generated by the clock generation unit 41. The clock phase adjust unit 43 synchronizes clocks of digital signal processes of the DMT modulation units 20 with use of the clock extracted by the clock extraction unit 42. In this case, the clock phase adjust unit 43 uses a difference of interconnection lines of the optical modules. The clock phase adjust unit 43 uses the above-mentioned difference, uses the cyclic prefix add unit 23, and adjust an insertion position of the cyclic prefix. The clock phase adjust unit 43 inputs information of an adjust amount of the cyclic prefix into the frame phase control unit 44.

The optical system information collect unit 45 inputs transmission path characteristic and a monitor result of the skew monitor unit 87 into the frame phase control unit 44. The frame phase control unit 44 determines a frame phase amount based on the information obtained from the clock phase adjust unit 43 and the optical system information collect unit 45 so that a delay difference of a cyclic prefix between multi-carrier signals after parallel transmission is reduced. The frame phase adjust unit 24 adjust a frame phase based on the frame phase amount determined by the frame phase control unit 44 and a position of the cyclic prefix. Thus, the delay difference of the cyclic prefix between the multi-carrier signals received by the optical receiver 102 is reduced.

FIG. 5 illustrates a table example of the transmission path characteristic. As illustrated in FIG. 5, in each example, the transmission path characteristic includes a signal multiplexing method, a transmission path distance, a wavelength, a wavelength dispersion, a propagation time difference and so on that are related to the channel number. The channel number is a number individually related to each optical module. The channel number corresponds to the number of parallel transmission path. A calculation condition of a wavelength dispersion calculation of wavelength multiplexing is that SMF (Single Mode Fiber) zero dispersion wavelength is 1310 nm, and a dispersion slope is 0.07 ps/nm$^2$/km. The calculation condition of a propagation time difference of a spatial multiplexing is that an optical propagation speed in a fiber is $2\times10^{18}$ m/s. The wavelength dispersion and the propagation time difference may be a predetermined setting value or may be the accumulated wavelength dispersion value and the propagation time difference input by the estimation unit 86.

The clock generation unit 81 generates a reference clock. The clock extraction unit 82 extracts a clock of the digital signal process of each of the DMT demodulation units 60 with use of the reference clock generated by the clock generation unit 81. The clock phase adjust unit 83 synchronizes clocks of the digital signal processes of the DMT demodulation units 60 with use of the clock extracted by the clock extraction unit 82. The clock phase adjust unit 83 inputs information of the clock adjust amount into the frame phase control unit 84.

The optical system information collect unit 85 inputs the transmission path characteristic and the monitor result of the skew monitor unit 87 into the frame phase control unit 84. The transmission path characteristic is common information with the optical transmitter 101. The frame phase control unit 84 determines the frame phase amount based on the information obtained from the clock phase adjust unit 83 and the optical system information collect unit 85 so that the delay difference of the cyclic prefix between the multi-carrier signals after the parallel transmission is reduced. The frame phase adjust unit 62 adjusts the frame phase based on the frame phase amount determined by the frame phase control unit 84 and the position of the cyclic prefix. Thus, the delay difference of the cyclic prefix between the multi-carrier signals received by the optical receiver 102 is reduced.

The frame phase monitor unit 63 monitors the frame phase of the multi-carrier signals after the parallel transmission based on the position of the cyclic prefix. The frame phase monitor unit 63 inputs a monitor result into the optical system information collect units 45 and 85. The optical system information collect unit 45 inputs the monitor result of the frame phase monitor unit 63 into the frame phase control unit 44. The frame phase control unit 44 determines the frame phase amount based on the monitor result so that the delay difference of the cyclic prefix between the multi-carrier signals after the parallel transmission is reduced. The frame phase adjust unit 24 adjusts the frame phase based on the frame phase amount determined by the frame phase control unit 44. The frame phase control unit 84 determines the frame phase amount based on the monitor result so that the delay difference of the cyclic prefix between the multi-carrier signals after the parallel transmission is reduced. The frame phase adjust unit 62 adjusts the frame phase based on the frame phase amount determined by the frame phase control unit 84. Thus, the delay difference of the cyclic prefix between the multi-carrier signals received by the optical receiver 102 is reduced.

The optical transmitter 101 and the optical receiver 102 control the frame phase based on the transmission path characteristic, the monitor result of the skew monitor unit 87 and the monitor result of the frame phase monitor unit 63. However, the optical transmitter 101 and the optical receiver 102 have only to control the frame phase based on at least one of the above-mentioned information. For example, the frame phase may be coarsely adjusted based on the transmission path characteristic and the monitor result of the skew monitor unit 87 during a probing and the frame phase may be finely adjusted based on the monitor result of the frame phase monitor unit 63 during an in-service (transmitting of a main signal). The frame phase adjust unit 24 and the frame phase adjust unit 62 may disperse the frame phase amount so that the phase adjusting of the frame phase adjust units 24 and 62 does not overlap with each other.

Figure 6A:
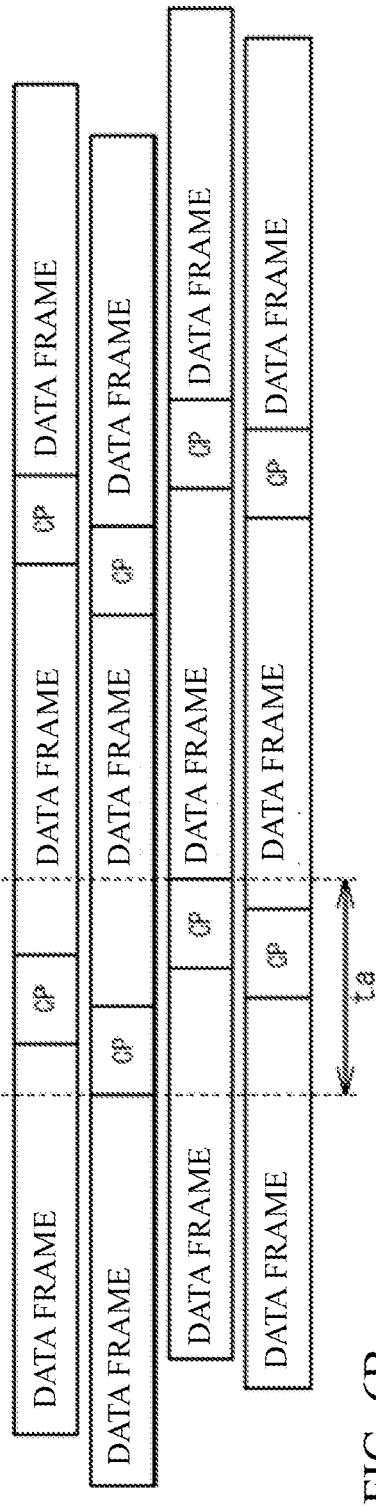
FIG. 6A and FIG. 6B illustrate a frame control of multi-carrier signals.
Figure 6B:
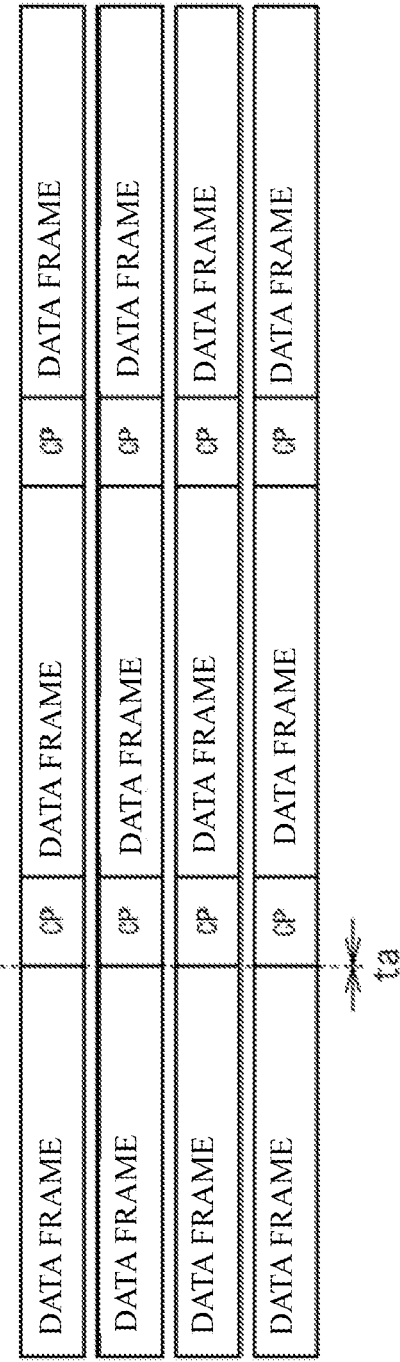

FIG. 6A and FIG. 6B illustrate the frame control of the multi-carrier signals. FIG. 6A illustrates a frame phase before an optical transmission by the optical transmitter 101. As illustrated in FIG. 6A, positions of cyclic prefixes are different from each other with respect to time because of an interconnection line difference between the optical modules. The largest delay difference with respect to time (the delay difference between the channel 2 and the channel 4 in the example of FIG. 6A) is referred to as delay difference "ta". The optical transmission system 100 controls the frame so that the delay difference "ta" between the multi-carrier signals after the parallel transmission is reduced. Thus, as illustrated in FIG. 6B, the delay difference "ta" is reduced. In the example of FIG. 6B, the delay difference "ta" is zero.

Figure 7:
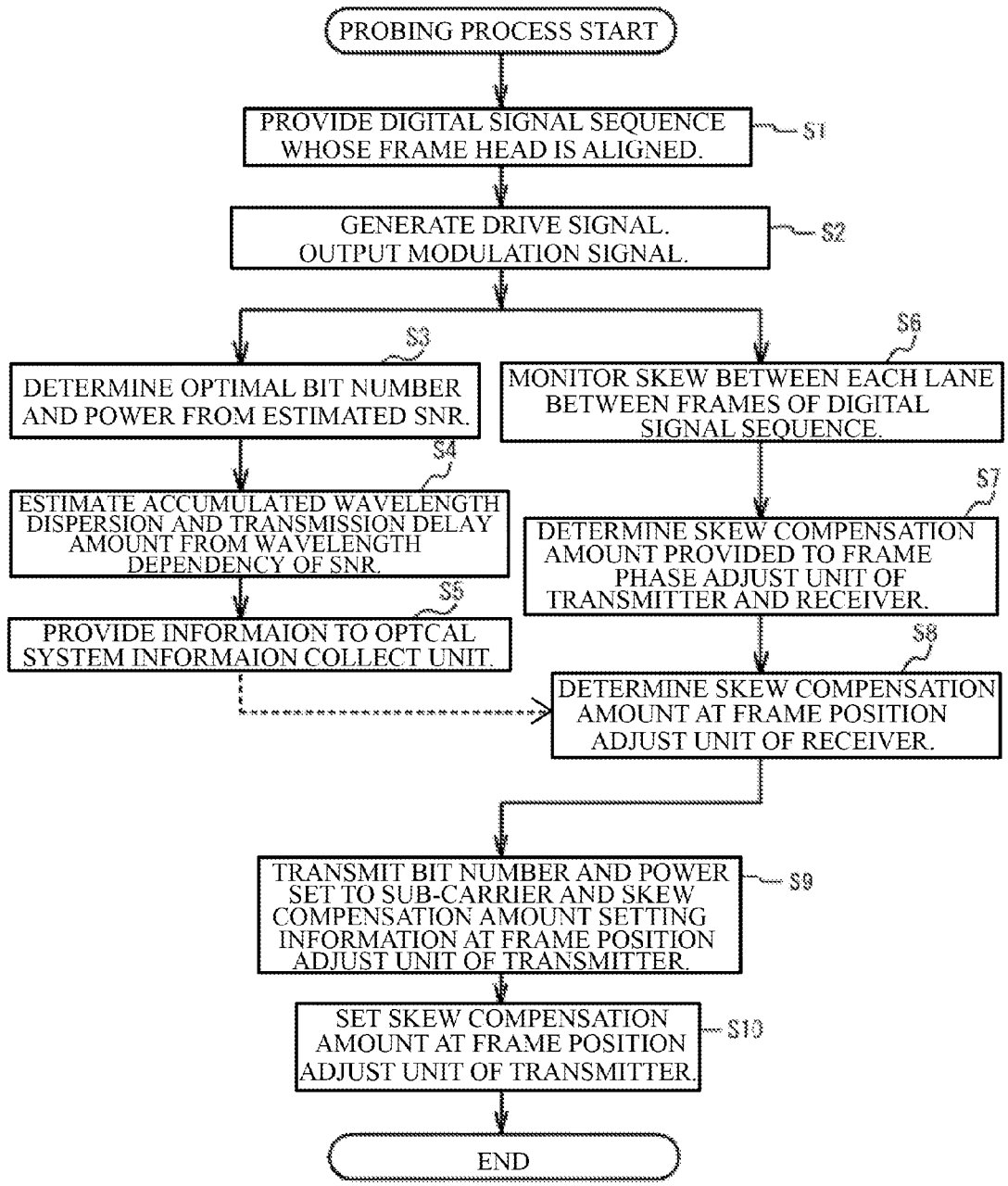
FIG. 7 illustrates an example of a flowchart of a frame control during a probing.

FIG. 7 illustrates an example of a flowchart of a frame control during the probing. As illustrated in FIG. 7, the serializer 10 provides a common digital signal sequence for the probing of which frame head is aligned to the parallelized DMT modulation units 20 (Step S1). For example, it is preferable that a signal sequence making each sub-carrier transmit a two-bit signal in which "1" and "0" are alternately arranged is used.

Next, each of the DMT modulation units 20 generates a drive signal based on the signal sequence for the probing. The optical transmitter device 30 outputs a modulation signal based on the drive signal (Step S2). Thus, the optical receiver 102 demodulates the modulation signal received from the optical transmitter 101. Next, the estimation unit 86 of the optical receiver 102 estimates the SNR after transmission of each sub-carrier based on the demodulation data obtained by the DMT demodulation unit 60, and determines an optimal bit number and a power value assigned to each sub-carrier (Step S3). Next, the estimation unit 86 estimates an accumulated wavelength dispersion value and a propagation time difference from a wavelength dependency of an SNR after the transmission (Step S4). The estimation unit 86 transmits the estimated accumulated wavelength dispersion value and the propagation time difference to the optical system information collect unit 85 (Step S5).

In parallel with the Steps S3 to S5, after the Step S2, the deserializer 70 performs an error correction process with respect to the demodulation data obtained by the DMT demodulation unit 60. The skew monitor unit 87 monitors a skew amount between each lane between frames of a digital signal sequence ("1" and "0") (Step S6). Next, the optical system information collect unit 85 determines the skew compensation amount provided to the frame phase adjust unit 24 of the optical transmitter 101 and the frame phase adjust unit 62 of the optical receiver 102 based on the monitor result of the skew monitor unit 87 (Step S7). The skew compensation amount is a compensation amount that allows reduction of the delay difference "ta" of the cyclic prefix between the multi-carrier signals after the parallel transmission.

The frame phase control unit 84 determines the skew compensation amount at the frame phase adjust unit 62 of the optical receiver 102 based on the estimated value of the accumulated wavelength dispersion value and the transmission delay amount input in the Step S5 and the skew compensation amount determined in the Step S6 (Step S8).

Next, the optical system information collect unit 85 transmits the information of the bit number and the power value that are set to each sub-carrier and the skew compensation amount setting information at the frame phase adjust unit 62 of the optical receiver 102 to the optical system information collect unit 45 (Step S9). The frame phase control unit 44 sets the skew compensation amount at the frame phase adjust unit 24 based on the information received by the optical system information collect unit 45 in the Step S9 (Step S10). The skew compensation amount is distributed to the optical transmitter 101 and the optical receiver 102, because the skew compensation setting information at the frame phase adjust unit 62 is used. With the processes, the skew can be adjusted during the probing.

Figure 8:
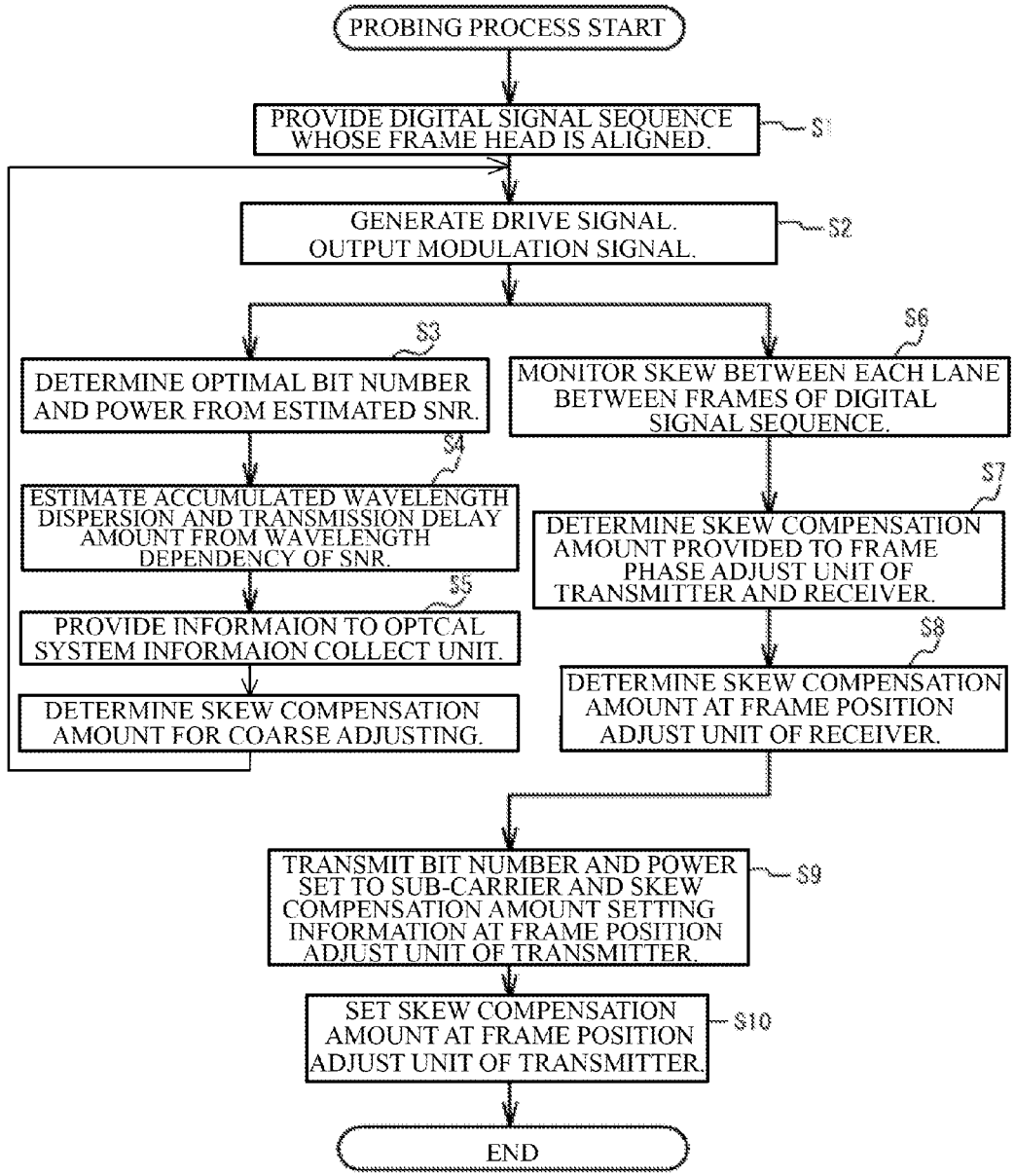
FIG. 8 illustrates another example of a flowchart of the frame control during the probing.

FIG. 8 illustrates another example of a flowchart of the frame control during the probing. A description will be given of a different point from FIG. 7. After the Step S5, the optical system information collect unit 85 determines each skew compensation amount for a coarse adjusting provided to the frame phase adjust unit 24 and the frame phase adjust unit 62 (Step S11). The frame phase control unit 44 and the frame phase control unit 84 set the skew compensation amount determined in the Step S11 to the frame phase adjust unit 24 and the frame phase adjust unit 62. After that, the Step S2 is executed again. In the skew adjusting method of FIG. 8, the skew can be reduced in advance. Thus, it is suppressed that the skew amount monitored in the Step S6 excesses a monitorable range.

Figure 9:
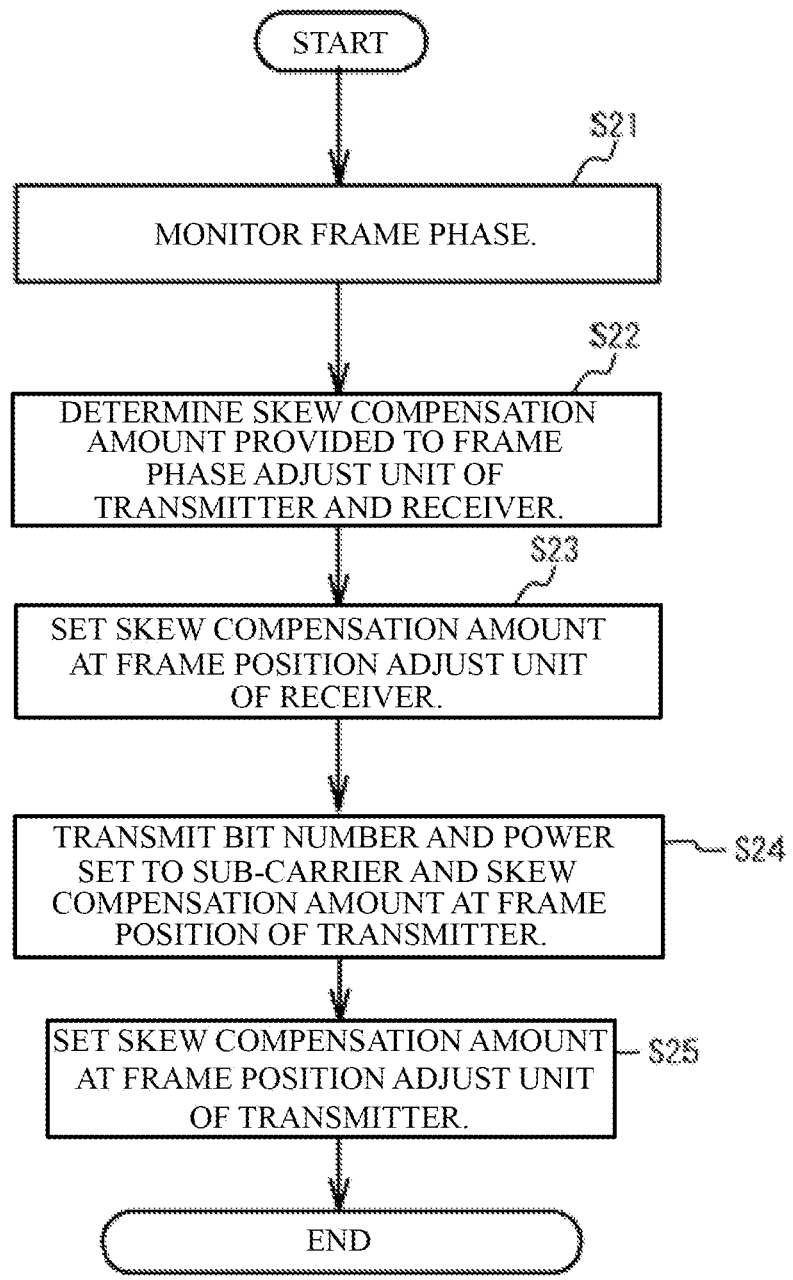
FIG. 9 illustrates an example of a flowchart of the frame control during an in-service.

FIG. 9 illustrates an example of a flowchart of the frame control during the in-service. As illustrated in FIG. 9, the frame phase monitor unit 63 monitors a frame phase (Step S21). Next, the optical system information collect unit 85 determines the skew compensation amount provided to the frame phase adjust unit 24 of the optical transmitter 101 and the frame phase adjust unit 62 of the optical receiver 102 based on the monitor result of the frame phase monitor unit 63 (Step S22).

The frame phase control unit 84 sets the skew compensation amount at the frame phase adjust unit 62 of the optical receiver 102 based on the skew compensation amount determined in the Step S22 (Step S23). Next, the optical system information collect unit 85 transmits the skew compensation amount setting information at the frame phase adjust unit 62 to the optical system information collect unit 45 (Step S24). The frame phase control unit 44 sets the skew compensation amount at the frame phase adjust unit 24 based on the information received by the optical system information collect unit 45 in the Step S24 (Step S25). A skew compensation overlapping with the optical receiver 102 can be prevented because the skew compensation amount setting information at the frame phase adjust unit 62 is used. With the processes, it is possible to finely adjust the skew during the in-service.

In the embodiment, drive signals for generating multi-carrier signals transmitted in parallel are generated in a plurality of independent digital signal processes of which clocks are synchronized. And, the delay difference "ta" of the cyclic prefix between the multi-carrier signals after transmission is reduced. With the structure, a simple de-skew can be achieved. A scalability of an architecture of the optical transmission system can be improved because the skew between the optical modules can be flexibly compensated for.

It is preferable that the number of the sub-carrier applied to each optical module is equal to a sampling rate (a baud rate of the sub-carrier applied to the DMT modulation unit and the DMT demodulation unit). This is because it is easy to multiplex each multi-carrier signal transmitted by each optical module and generate a high speed signal. It is preferable that the clock of the digital signal process of the DMT modulation unit and the DMT demodulation unit corresponds to a baud rate of the sub-carrier. For example, it is preferable that the clock is approximately 125 MHz (8 μs) in the case where the number of the sub carrier is 256 at 64 GS/s. This is because the delay is ps order even if the wavelength dispersion and the interconnection line delay occur, and the frame control can be achieved when the cyclic prefixes are aligned. Although both the optical transmitter 101 and the optical receiver 102 perform the frame phase control, one of the optical transmitter 101 and the optical receiver 102 has only to perform the frame phase control.

[Second Embodiment]

Figure 10A:
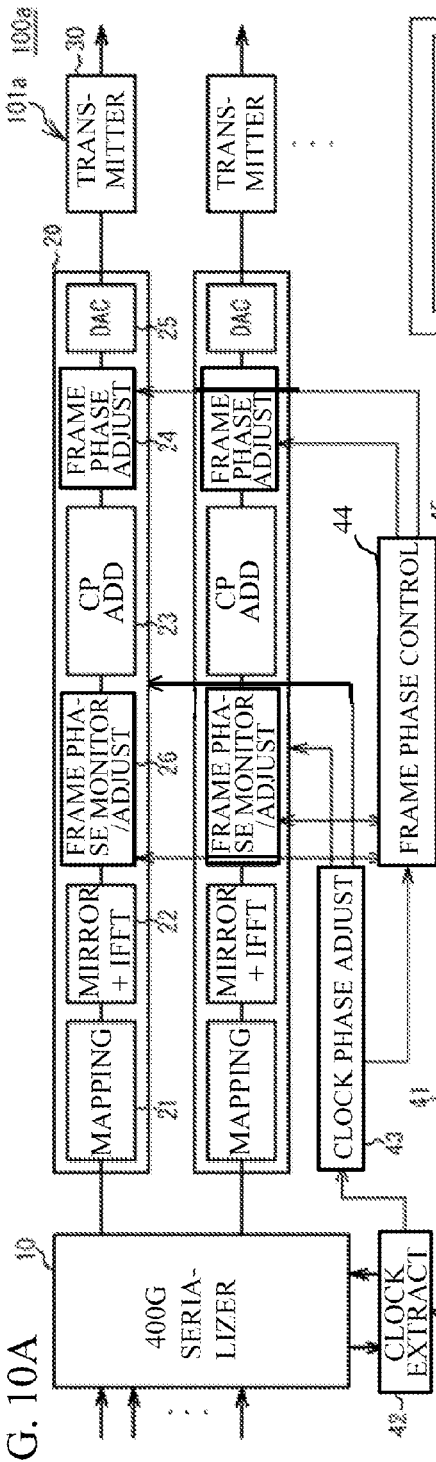
FIG. 10A and FIG. 10B illustrate a block diagram of an optical transmission system in accordance with a second embodiment.
Figure 10B:
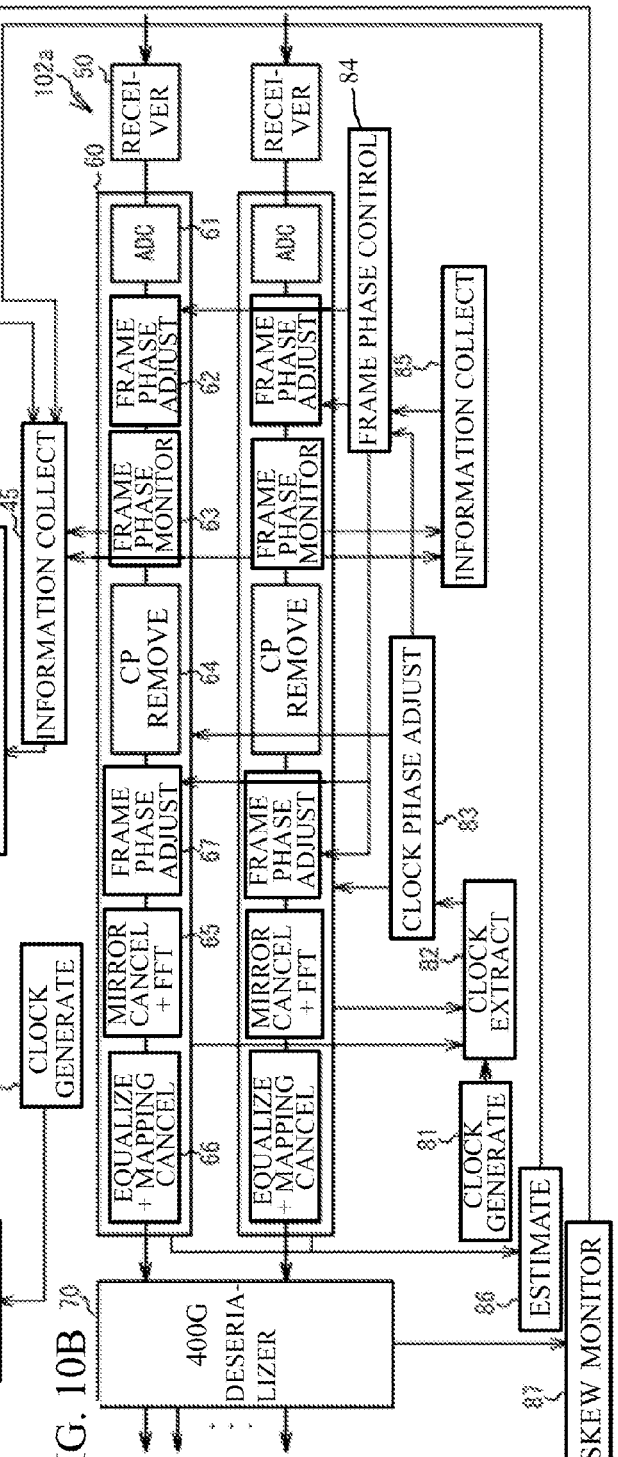

In the first embodiment, the delay difference "ta" is reduced by controlling the frame phase to which a cyclic prefix is added. However, the structure it not limited. A second embodiment reduces the delay difference "ta" by controlling an adding position of the cyclic prefix. FIG. 10A and FIG. 10B illustrate a block diagram of an optical transmission system 100a in accordance with the second embodiment. FIG. 10A illustrates an optical transmitter 101a. FIG. 10B illustrates an optical receiver 102a. The optical transmission system 100a has a structure in which the optical transmitter 101a and the optical receiver 102a are coupled with each other via an optical transmission path having a plurality of lanes.

A description will be given of a different point from the optical transmission system 100 of the first embodiment. The optical transmitter 101a further has a frame phase monitor/adjust unit 26. The frame phase monitor/adjust unit 26 is provided between the mirror/inverse Fourier transform unit 22 and the frame phase adjust unit 24. The optical receiver 102a further has a frame phase adjust unit 67. The frame phase adjust unit 67 is provided between the cyclic prefix remove unit 64 and the mirror cancel/Fourier transform unit 65.

The frame phase monitor/adjust unit 26 monitors a position of a cyclic prefix inserted by the control of the frame phase control unit 44. The frame phase monitor/adjust unit 26 controls the frame phase based on the monitor result so that a position difference of the cyclic prefix between the multi-carrier signals is reduced. The frame phase adjust unit 67 adjusts the frame phase based on the frame phase adjust amount by the frame phase monitor/adjust unit 26.

In the embodiment, drive signals for generating multi-carrier signals transmitted in parallel are generated in a plurality of independent digital signal processes of which clocks are synchronized, and the delay difference "ta" of the cyclic prefix is reduced between the multicarrier signals after transmission. With the structure, a simple de-skew can be achieved. Scalability of an architecture of the optical transmission system is improved because the skew between the optical modules is flexibly compensated for. Although both the optical transmitter 101a and the optical receiver 102a control the adding position of the cyclic prefix, one of the optical transmitter 101a and the optical receiver 102a has only to control the adding position of the cyclic prefix. However, when both the optical transmitter 101a and the optical receiver 102a control the adding position of the cyclic prefix, it is possible to flexibly take measures even if the structure of the optical transmission system 100a is changed.

[Third Embodiment]

Figures 11A, 11B:
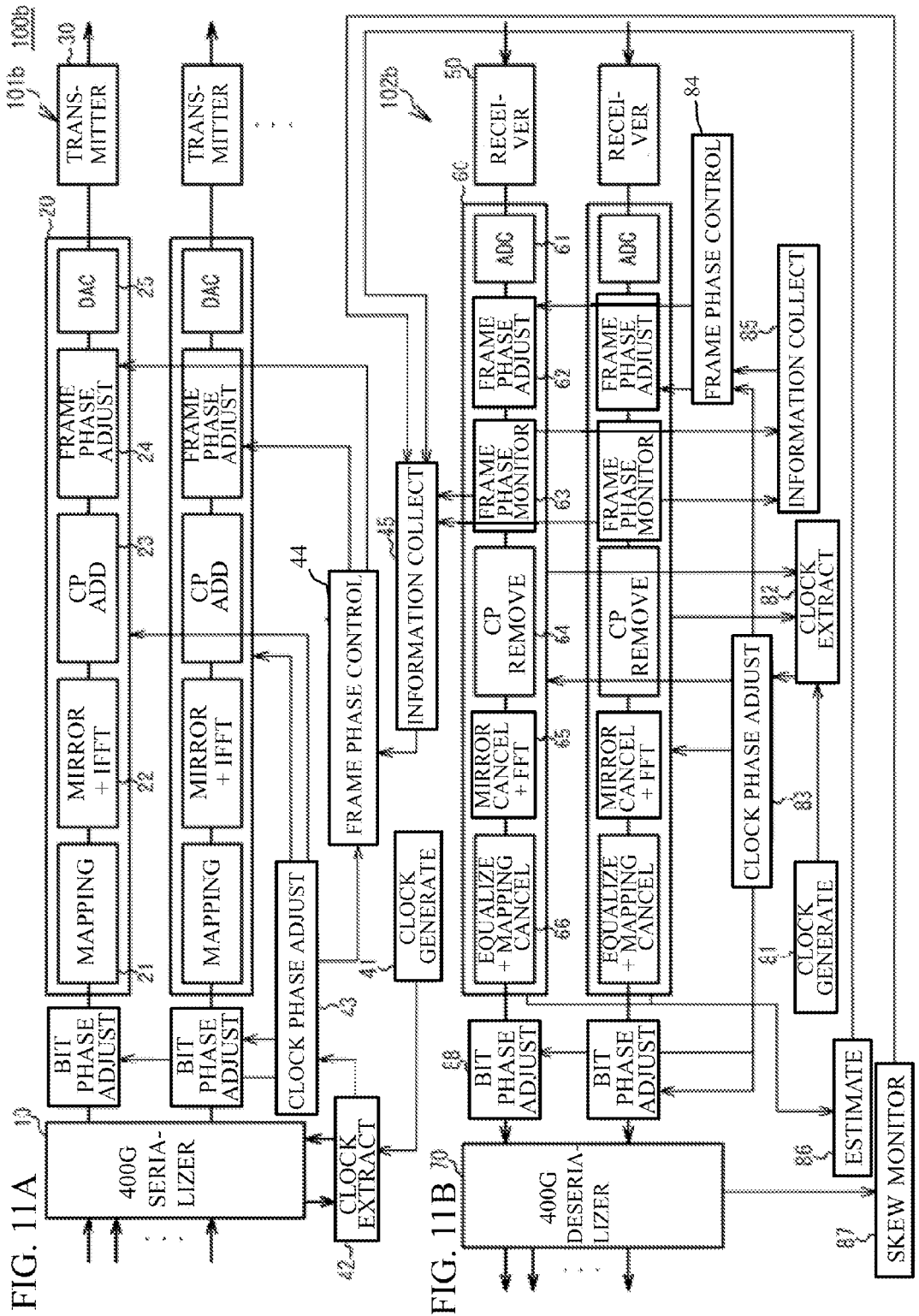
FIG. 11A and FIG. 11B illustrate a block diagram of an optical transmission system in accordance with a third embodiment.

In the first and second embodiments, a phase synchronization is used during the clock synchronization. However, synchronization by the frame phase adjusting can achieve the bit synchronization. Both the bit synchronization and the phase synchronization may be performed. A third embodiment performs both the bit synchronization and the phase synchronization. FIG. 11A and FIG. 11B illustrate a block diagram of an optical transmission system 100b in accordance with the third embodiment. FIG. 11A illustrates an optical transmitter 101b. FIG. 11B illustrates an optical receiver 102b. The optical transmission system 100b has a structure in which the optical transmitter 101b and the optical receiver 102b are coupled with each other via an optical transmission path having a plurality of lanes.

A description will be given of a different point from the optical transmission system 100. The optical transmitter 101b further has a bit phase adjust unit 46. The bit phase adjust unit 46 is provided between the serializer 10 and the DMT modulation unit 20. The number of the bit phase adjust unit 46 is the same as that of the optical modules. The optical receiver 102b further has a bit phase adjust unit 88. The bit phase adjust unit 88 is provided between the DMT demodulation unit 60 and the deserializer 70. The number of the bit phase adjust unit 88 is the same as that of the optical modules.

A demodulation data forming a frame of which phase is adjusted is an NRZ electrical signal composed of "1" and "0". Each phase of the NRZ electrical signals may be aligned by bit in the bit phase adjust units 46 and 88 that are clock-synchronized with the NRZ electrical signal.

In the above first to third embodiments, each DMT modulation unit may be structured by a single chip. However, a single chip may have a plurality of DMT modulation units. Each demodulation unit may be structure by a single chip. However, a single chip may have a plurality of DMT demodulation units. That is, even if a single chip has a plurality of digital signal process units, a plurality of independent digital signal processes have only to be performed. In the above-mentioned embodiments, DMT modulation unit 20 and the DMT demodulation unit 60 act as a digital signal process unit. The clock phase adjust units 43 and 83 act as a synchronization unit. The frame phase control units 44 and 84 act as an adjust unit.

[Fourth Embodiment]

In the first to third embodiments, the DMT modulation method is described. However, an OFDM modulation method has the same function effect. FIG. 12A illustrates a block diagram of an OFDM modulation unit. FIG. 12B illustrates a structure of an OFDM demodulation unit. The OFDM modulation unit and the OFDM demodulation unit are different from the DMT modulation unit 201 of FIG. 2A and the DMT demodulation unit 303 of FIG. 2B in a point that the mirror unit 206 and the mirror cancel unit 307 are not provided.

FIG. 13A and FIG. 13B illustrate a block diagram of an optical transmission system 100c using the OFDM modulation method in accordance with a fourth embodiment. The optical transmission system 100c is different from FIG. 4A and FIG. 4B in a point that an OFDM modulation unit 20c is provided instead of the DMT modulation unit 20 and an OFDM demodulation unit 60c is provided instead of the DMT demodulation unit 60. The OFDM modulation unit 20c is different from the DMT modulation unit 20 in a point that an inverse Fourier transform unit 22c is provided instead of the mirror/inverse Fourier transform unit 22. The OFDM demodulation unit 60c is different from the DMT demodulation unit 60 in a point that a Fourier transform unit 65c is provided instead of the mirror cancel/Fourier transform unit 65. The inverse Fourier transform unit 22c performs an inverse Fourier transform without mirroring. The Fourier transform unit 65c performs Fourier transform without mirror canceling. The OFDM modulation method can be applied to the second and third embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmitter comprising:
   a serializer that receives a transmission data and outputs a plurality of serial data;
   a digital signal process unit that generates a drive signal for generating multi-carrier signals through a plurality of independent digital signal processes from the plurality of serial data, a number of the plurality of serial data being the same as a number of the plurality of independent digital processes, the multi-carrier signals each having a cyclic prefix associated with it and to be transmitted by a parallel transmission;
   a synchronization unit that synchronizes clocks of the plurality of digital signal processes;
   an obtain unit that obtains a delay difference of the cyclic prefix between the multi-carrier signals after the parallel transmission; and an adjust unit that adjusts frame phase amounts of the multi-carrier signals so that the delay difference is reduced.

2. The optical transmitter as claimed in claim 1, wherein the obtain unit obtains the delay difference of the cyclic prefix based on characteristic of a transmission path in which the multi-carrier signals are transmitted.

3. The optical transmitter as claimed in claim 2, wherein the characteristic of the transmission path includes at least one of a transmission path distance, a wavelength dispersion, and a parallel number of the transmission path.

4. The optical transmitter as claimed in claim 2, wherein the characteristic of the transmission path includes an accumulated wavelength dispersion value and a transmission delay amount obtained from a wavelength dependency of an SNR of the multi-carrier signals after the parallel transmission.

5. The optical transmitter as claimed in claim 1, wherein the obtain unit obtains the delay difference of the cyclic prefix between the multi-carrier signals after the parallel transmission based on a monitor result of the cyclic prefix of the multi-carrier signals after the parallel transmission.

6. An optical receiver comprising:
a digital signal process unit that demodulates multi-carrier signals through a plurality of independent digital signal processes, the multi-carrier signals each having a cyclic prefix associated with it and transmitted by a parallel transmission;
a synchronization unit that synchronizes clocks of the plurality of digital signal processes;
an obtain unit that obtains a delay difference of the cyclic prefix between the multi-carrier signals after the parallel transmission; and
an adjust unit that adjusts frame phase amounts of the multi-carrier signals so that the delay difference is reduced.

7. The optical receiver as claimed in claim 6, wherein the obtain unit obtains the delay difference of the cyclic prefix based on characteristic of a transmission path in which the multi-carrier signals are transmitted.

8. The optical receiver as claimed in claim 7, wherein the characteristic of the transmission path includes at least one of a transmission path distance, a wavelength dispersion, and a parallel number of the transmission path.

9. The optical receiver as claimed in claim 7, wherein the characteristic of the transmission path includes an accumulated wavelength dispersion value and a transmission delay amount obtained from a wavelength dependency of an SNR of the multi-carrier signals after the parallel transmission.

10. The optical receiver as claimed in claim 6, wherein the obtain unit obtains the delay difference of the cyclic prefix between the multi-carrier signals after the parallel transmission based on a monitor result of the cyclic prefix of the multi-carrier signals after the parallel transmission.

11. An optical transmission system comprising:
an optical transmitter;
an optical receiver; and
a transmission path that has a plurality of lanes that optically couple the optical transmitter and the optical receiver,
the optical transmitter comprising:
a digital signal process unit that generates a drive signal for generating multi-carrier signals through a plurality of independent digital signal processes, the multi-carrier signals each having a cyclic prefix associated with it and to be transmitted by a parallel transmission;
a synchronization unit that synchronizes clocks of the plurality of digital signal processes;
an obtain unit that obtains a delay difference of the cyclic prefix between the multi-carrier signals after the parallel transmission; and
an adjust unit that adjusts frame phase amounts of the multi-carrier signals so that the delay difference is reduced,
the optical receiver comprising:
a digital signal process unit that demodulates multi-carrier signals through a plurality of independent digital signal processes, the multi-carrier signals each having a cyclic prefix associated with it and transmitted by a parallel transmission;
a synchronization unit that synchronizes clocks of the plurality of digital signal processes;
an obtain unit that obtains a delay difference of the cyclic prefix between the multi-carrier signals after the parallel transmission; and
an adjust unit that adjusts frame phase amounts of the multi-carrier signals so that the delay difference is reduced.

12. An optical transmitting method comprising:
receiving a transmission data and outputting a plurality of serial data;
synchronizing clocks of a plurality of independent digital signal processes when generating a drive signal for generating multi-carrier signals through the plurality of digital signal processes from the plurality of serial data, a number of the plurality of serial data being the same as a number of the plurality of independent digital processes, the multi-carrier signals each having a cyclic prefix associated with it and to be transmitted by a parallel transmission;
obtaining a delay difference of the cyclic prefix between the multi-carrier signals after the parallel transmission; and
adjusting frame phase amounts of the multi-carrier signals so that the delay difference is reduced.

13. An optical receiving method comprising:
synchronizing clocks of a plurality of independent digital signal processes when demodulating multi-carrier signals through the plurality of digital signal processes, the multi-carrier signals each having a cyclic prefix associated with each it and transmitted by a parallel transmission;
obtaining a delay difference of the cyclic prefix between the multi-carrier signals after the parallel transmission; and
adjusting frame phase amounts of the multi-carrier signals so that the delay difference is reduced.

14. An optical transmission method that transmits multi-carrier signals having a cyclic prefix by a parallel transmission, the method comprising:
performing an optical transmitting method; and
performing an optical receiving method,
the optical transmitting method comprising:
synchronizing clocks of a plurality of independent digital signal processes when generating a drive signal for generating multi-carrier signals through the plurality of digital signal processes, the multi-carrier signals each having a cyclic prefix associated with it and to be transmitted by a parallel transmission;
obtaining a delay difference of the cyclic prefix between the multi-carrier signals after the parallel transmission; and adjusting frame phase amounts of the multi-carrier signals so that the delay difference is reduced, the optical receiving method comprising:

synchronizing clocks of a plurality of independent digital signal processes when demodulating multi-carrier signals through the plurality of digital signal processes, the multi-carrier signals each having a cyclic prefix associated with each it and transmitted by a parallel transmission; and obtaining a delay difference of the cyclic prefix between the multi-carrier signals after the parallel transmission; and adjusting frame phase amounts of the multi-carrier signals so that the delay difference is reduced.

* * * * *